(12) United States Patent
Dean

(10) Patent No.: US 10,900,398 B2
(45) Date of Patent: Jan. 26, 2021

(54) MUFFLER FILTER

(71) Applicant: Christopher Dean, Discovery Bay, CA (US)

(72) Inventor: Christopher Dean, Discovery Bay, CA (US)

( * ) Notice: Subject to any disclaimer, the term of this patent is extended or adjusted under 35 U.S.C. 154(b) by 93 days.

(21) Appl. No.: 16/297,588

(22) Filed: Mar. 9, 2019

(65) Prior Publication Data
US 2019/0277173 A1 Sep. 12, 2019

Related U.S. Application Data

(60) Provisional application No. 62/671,475, filed on May 15, 2018.

(51) Int. Cl.
*F01N 3/08* (2006.01)
*F01N 13/18* (2010.01)
*F01N 13/00* (2010.01)

(52) U.S. Cl.
CPC ......... *F01N 3/0821* (2013.01); *F01N 3/0857* (2013.01); *F01N 13/009* (2014.06); *F01N 13/18* (2013.01); *F01N 13/1805* (2013.01)

(58) Field of Classification Search
CPC .. F01N 3/0821; F01N 3/0857; F01N 13/1805; F01N 13/18; F01N 13/009; F01N 2450/30; F01N 2450/10; F01N 2450/18; F01N 13/082; F01N 3/021; Y02T 10/12
See application file for complete search history.

(56) References Cited

U.S. PATENT DOCUMENTS

| 3,675,398 A * | 7/1972 | Giarrizzo | B01D 53/86 96/132 |
| 5,606,854 A * | 3/1997 | Hoffmann | F01N 3/0212 60/274 |
| 6,095,460 A * | 8/2000 | Mercer | F01N 13/1822 180/309 |
| 6,244,918 B1 * | 6/2001 | Cameron | F01N 3/021 440/89 R |
| 6,981,567 B2 * | 1/2006 | Stodolka | B60K 13/04 180/296 |
| 7,523,605 B2 * | 4/2009 | Whitaker | F01N 3/0211 60/297 |
| 2007/0119155 A1 * | 5/2007 | Tongu | F01N 13/1805 60/299 |

FOREIGN PATENT DOCUMENTS

EP    1953355 A1 *  8/2008  ............ F01N 3/0211

* cited by examiner

*Primary Examiner* — Michael C Zarroli
(74) *Attorney, Agent, or Firm* — The Concept Law Group, PA; Scott D. Smiley; Andre L. Adkins

(57) ABSTRACT

A muffler filter within a housing (1) is disclosed, which is capable of being secured to an automobile rear bumper adjacent the exhaust of an automobile. The filter housing (1) is attached to vehicle with top (11) and bottom (12) clamps. The filters (3, 4) are attached to removable cartridge holder (2). The fireproof band (6) and filter interlocks (7) are attached over housing (1) for locking the filter. The movable slide (8) is attached to housing (1) for connecting filter to bottom of bumper. Fire proof strap (9) for connecting filter to top of bumper is located on top of housing (1). The filters (3, 4) are mainly activated charcoal filters combined with ionic transport membrane system and comprises absorbent material in a matrix capable of absorbing a plurality of noxious fumes emitted from the exhaust the automobile. The filters are capable of being replaced.

10 Claims, 4 Drawing Sheets

MUFFLER FILTER

TECHNICAL FIELD

The present invention relates to a muffler filter which will alleviate carbon emissions and toxic fumes from entering the environment.

BACKGROUND OF THE INVENTION

Today air pollution is a biggest problem for society. Air pollution occurs when harmful or excessive quantities of substances including gases, particles, and biological molecules are introduced into Earth's atmosphere.

It is undeniable that private cars has brought a great deal of travelling convenience. Cars, trucks, and buses powered by fossil fuels are major contributors to air pollution and also a major source of global warming emissions. The large majority of today's cars and trucks travel by using internal combustion engines that burn gasoline or other fossil fuels. The process of burning gasoline to power cars and trucks contributes to air pollution by releasing a variety of emissions into the atmosphere. Emissions that are released directly into the atmosphere from the tailpipes of cars and trucks are the primary source of vehicular pollution.

There are four major pollutants that come from cars:
1. A car emits carbon monoxide when the carbon in fuel doesn't burn completely.
2. A car's exhaust emits hydrocarbons, a toxic compound of hydrogen and carbon.
3. When fuel burns, nitrogen and oxygen react with each other and form nitrogen oxides ($NO_x$).
4. Particulate matter—small particles of foreign substances—in the air contribute to atmospheric haze and can damage people's lungs.

These pollutants produce photochemical air pollution affecting not only the urban concentrations but also the contiguous rural areas. The effect of these pollutants ensues on food, fibre, forage, and forest crops also. These pollutant inhibit plant growth, damage crops and forests and also contributes to the formation of acid rain and global warming. Acid rain does not usually kill trees directly. Instead, it is more likely to weaken the trees by damaging their leaves, limiting the nutrients available to them, or poisoning them with toxic substances slowly released from the soil. Ultimately, consumption of low quality affected crops affects human health. The emissions of heat trapping gases rising the water temperatures which lead to rising sea levels. Sea-level rise can lead to saltwater intrudes into groundwater drinking supplies, irrigation supplies, or will overrun agricultural fields and also will create threat to coastal communities.

With today's increasing awareness of the need to protect the environment from the harmful effects of poor air quality and global warming, heightened standards and more stringent restrictions have been placed on materials and products that can produce negative impacts. More specifically, a great deal of focus has been placed on internal combustion engines fuelled by gasoline, as they contribute a great deal to the poor air quality.

There are many pollution control devices are available in the market and several attempts have been made to provide suitable pollution control filter device for vehicle exhaust but they are either fail to reduce toxic emissions or they are expensive. Hence there is a need to develop such a muffler filter for vehicles which alleviate toxic emissions, easy to use and replace and also cost effective. The present invention has been made to solve the aforementioned problems occurring in the related art.

OBJECTIVE OF THE INVENTION

The main objective of the present invention to provide a muffler exhaust filtration addition. Further objective of the present invention to provide a muffler filter that comprises of an absorbent material in a matrix capable of absorbing a plurality of noxious fumes emitted from the exhaust the automobile.

Another objective of the present invention to provide a muffler filter with the capability of being replaceable.

Other objective of the present invention to provide a muffler filter that is attached to the rear bumper and underside of any motor vehicle.

Yet another objective of the present invention to provide an ease of conversion from a vehicle emitting toxic pollutants to a clean emission vehicle by attaching the muffler filter to the exhaust.

SUMMARY OF THE INVENTION

The present invention provides the muffler filter within a housing (1) is capable of being secured to an automobile rear bumper adjacent the exhaust of an automobile. The filter housing (1) is attached to vehicle with top (11) and bottom (12) clamps. The filters (3, 4) are attached to removable cartridge holder (2). The fireproof band (6) and filter interlock (7) are attached over housing (1) for locking the filter. The movable slide (8) is attached to housing (1) for connecting filter to bottom of bumper. Fire proof strap (9) for connecting filter to top of bumper is located on top of housing (1). The filters (3, 4) are mainly activated charcoal filters combined with ionic transport membrane system and other additional filters. Activated charcoal filters combined with ionic transport membrane system comprises absorbent material in a matrix capable of absorbing a plurality of noxious fumes emitted from the exhaust the automobile. The filters are capable of being replaced.

BRIEF DESCRIPTION OF THE DRAWINGS

The invention can be better understood with reference to the following drawings.

DETAILED DESCRIPTION OF THE INVENTION

Before explaining the present invention in detail, it is to be understood that the invention is not limited in its application to the details of the construction and arrangement of parts illustrated in the accompany drawings. The invention is capable of other embodiments and of being practiced or carried out in a variety of ways. It is to be understood that the phraseology and terminology employed herein is for the purpose of description and not of limitation.

Figure 1:
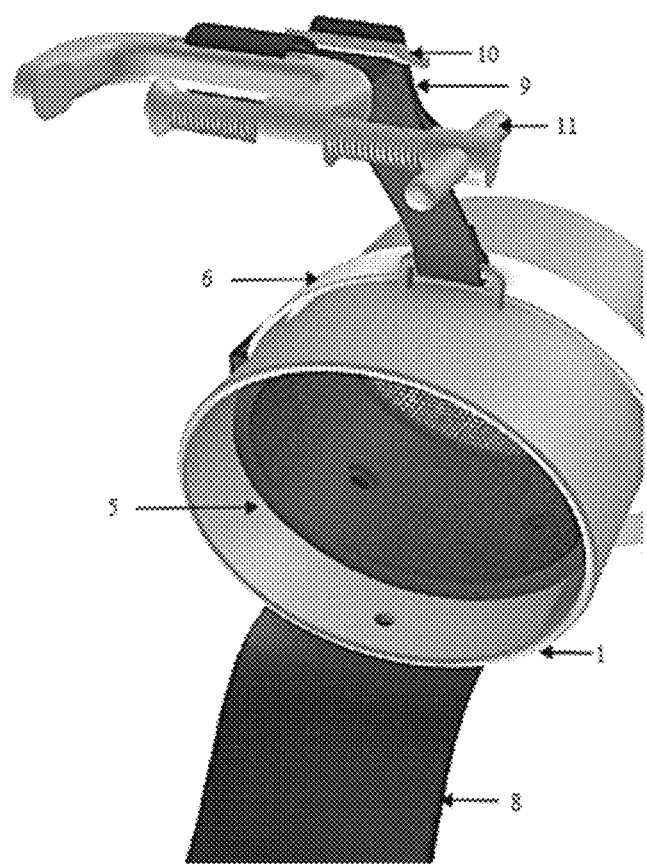
FIG. 1 shows front view of the Muffler filter

As shown in FIG. 1, the muffler filter comprises of housing (1), within which filters (3, 4) are located. On the top of the housing, a fireproof band (6) is attached permanently for locking the cartridge holder (2) along with filter interlock (7). On the top of housing (1), fire proof strap (9)

with strap lock (10) and clamp (11) is attached. At the bottom of housing (1), movable slide (8) is attached for connecting filter to bottom of bumper.

Figure 2:
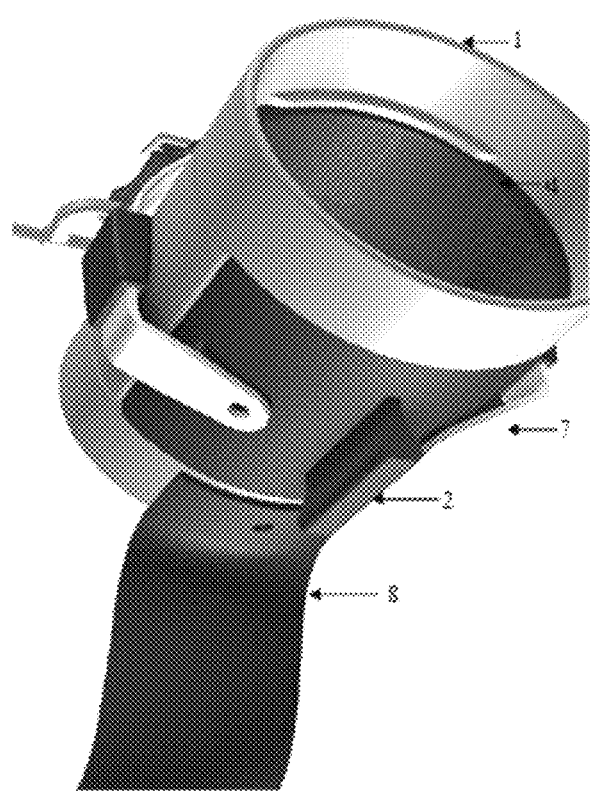
FIG. 2 shows back view of the Muffler filter

As shown in FIG. 2, filter (4) is located in housing (1). At the bottom of housing (1), movable slide (8) is attached for connecting filter to bottom of bumper. The filter interlock (7) is attached to bottom of housing (1) for locking into fireproof band (6).

Figure 3:
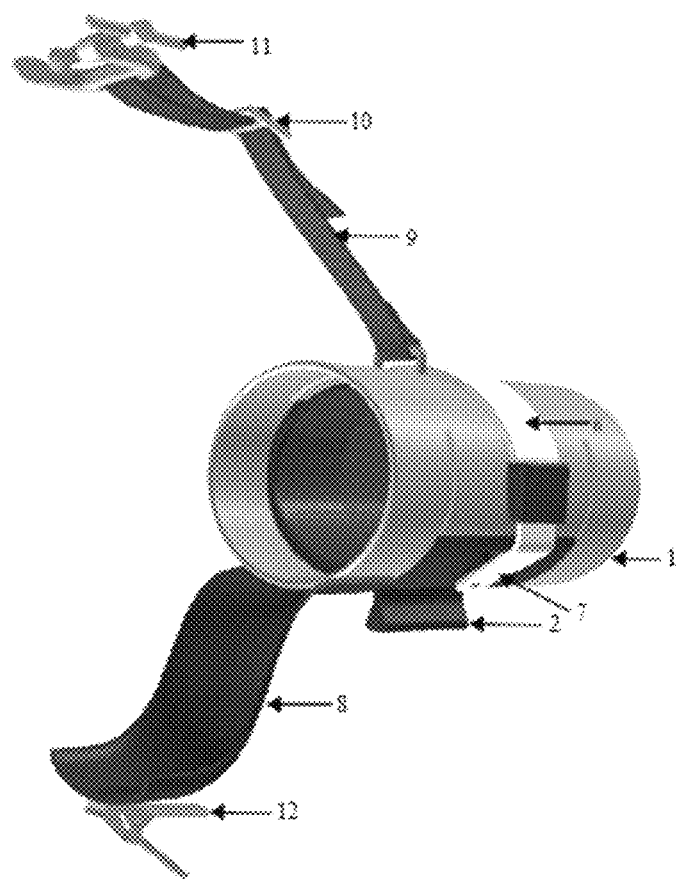
FIG. 3 shows side view of the Muffler filter

As shown in FIG. 3, shows side view of the muffler filter.

Figure 4:
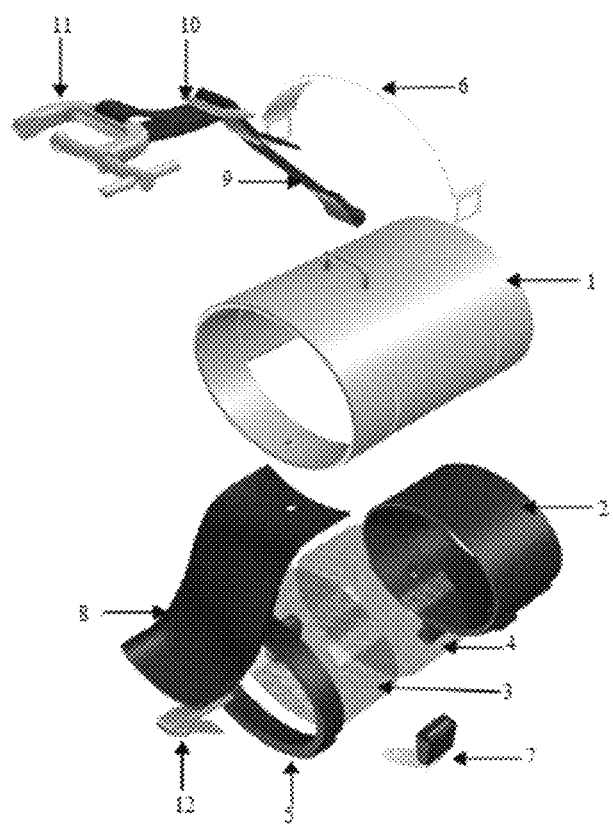
FIG. 4 shows exploded view of the Muffler filter

FIG. 4 shows exploded view of internal components of the muffler filter. A shown in figure, the filter comprises a housing (1) with an open end at bottom within which fire resistant removable cartridge holder (2) is embedded. Inside the removable cartridge holder (2), activated charcoal filters combined with ionic transport membrane system (3, 4) and other additional filters are placed for absorbing a plurality of noxious fumes emitted from the exhaust the automobile. The cartridge holder is having ring like structure at anterior end which is a front (5) of cartridge holder (2). On the top of housing (1), a fireproof band (6) is situated permanently for locking filter cartridge holder with the help of filter interlock (7), which is located at the bottom of housing (1). Filter interlocks (7) are present on both the sides of housing (1). The fireproof strap (9) is positioned on upper side of housing (1) for joining muffler filter to top of vehicle. The strap lock (10) is provided on strap (9) for adjusting the length of strap (9). At the end of strap (9), a clamp (11) is located for fixing the muffler filter to top of vehicle either inside or outside. The moveable slide (8) is connected at bottom of housing (1) for connecting the muffler filter at the bottom side of bumper through clamp (12).

All part of muffler filter are made of metal and whole assembly is incombustible.

In operation, the clamp (11) is attached to top of the vehicle and clamp (12) is attached to bottom of the vehicle or bumper to position the muffler filter. After positioning, the muffler filter will be ready. When toxic fumes will emit from vehicle that will pass through the filters (3, 4) and the activated charcoal and ionic transport membranes present in filters will lessen elimination of toxic pollutants from fumes. So that non-toxic fumes will emit from vehicle.

The muffler filter is replaceable after every 3 months or as per use of vehicle individual can observe visually and can decide to replace it. Replacement is very easy, only by unlocking filter interlock (7) from band (6) to remove cartridge.

The present invention provide a unique filter for avoiding access of toxic pollutants into the environment up to certain level.

Another advantage is easy to use and easy to assemble.

The further advantage of present invention is it can be used for cars, Trucks, Buses, Planes, Trains, Motorcycles, etc.

The yet another advantage is replaceable.

While embodiment of the present invention have been described in details, it is apparent that modification and adaptation of those embodiments will occur to those skilled in the art. It is expressly understood, however, that such modifications and adaptations are within the spirit and scope of the present invention as set forth in the following claims.

I claim:

1. A muffler filter comprising:
   a. a housing unit (1) featuring an open end;
   b. a removable cartridge holder (2) with a ring like front (5) on the interior side of the housing unit;
   c. two activated charcoal filters (3, 4) which are combined with an ionic transport membrane system;
   d. a locking system involving a fire-resistant band (6) and a filter interlock (7),
   e. a movable slide (8) panel that connects the filter to a support structure;
   f. two clamps (11, 12) which provide support to the filter with the support structure and;
   g. a support strap (9) with a locking system (10),
whereas the components of the filter are used for limiting the escape of toxic pollutants into the environment.

2. The muffler filter as claimed in claim 1 wherein the removable cartridge holder (2) is embedded in open end of housing (1).

3. The muffler filter as claimed in claim 1 wherein the pair of activated charcoal filters (3, 4) combined with ionic transport membrane system is located inside the removable cartridge holder (2) for removal of toxic pollutants from toxic fumes emitted from vehicles.

4. The muffler filter as claimed in claim 1 wherein the resistant band (6) is mounted on housing (1) which is fix.

5. The muffler filter as claimed in claim 1 wherein the filter interlock (7) is mounted at bottom of housing (1) which locks filter cartridge holder (2) with resistant band (6).

6. The muffler filter as claimed in claim 1 wherein the moveable slide (8) is located at bottom of housing (1) for connecting the muffler filter at the bottom side of bumper.

7. The muffler filter as claimed in claim 1 wherein the strap (9) is located on the upper side of housing (1) for fixing the muffler filter to top of vehicle either inside or outside.

8. The muffler filter as claimed in claim 1 wherein the strap lock is provided on strap (9) for adjusting the length of strap (9).

9. The muffler filter as claimed in claim 1 wherein the clamp (11) is attached to strap (9) for mounting filter to top of vehicle.

10. The muffler filter as claimed in claim 1 wherein the clamp (12) is attached to moveable lid (8) for mounting filter to bottom of vehicle or bumper.

* * * * *